Aug. 5, 1924.

W. C. DAVIS 1,504,102

APPLIANCE FOR BROILING, COOKING, AND TOASTING FOODSTUFFS

Filed Aug. 7, 1923     2 Sheets-Sheet 1

Inventor
W. C. Davis
Atty

Aug. 5, 1924.
W. C. DAVIS
1,504,102
APPLIANCE FOR BROILING, COOKING, AND TOASTING FOODSTUFFS
Filed Aug. 7, 1923 2 Sheets-Sheet 2
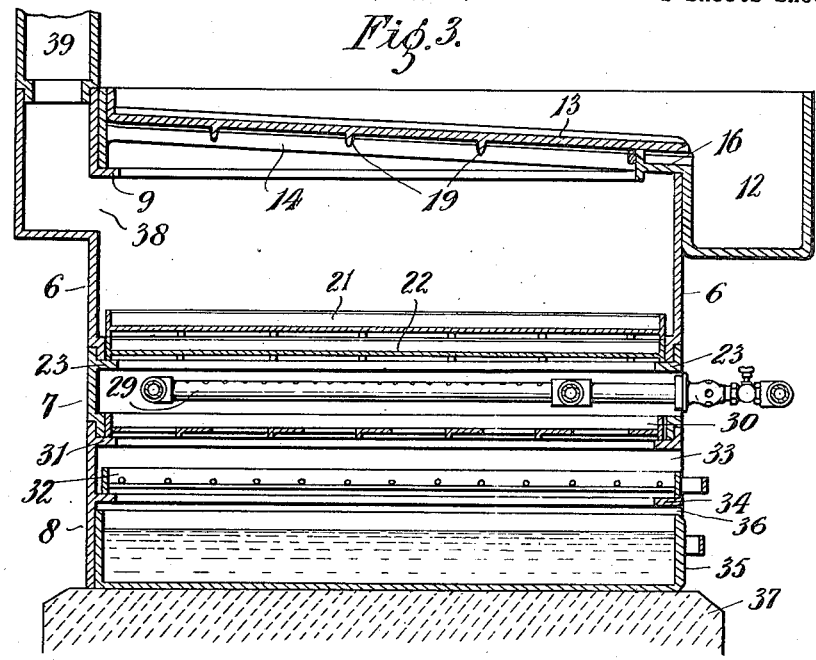
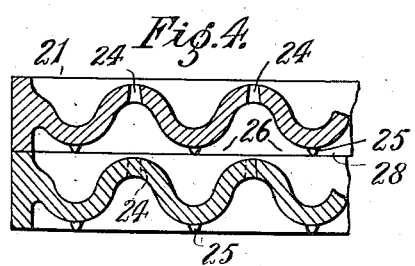
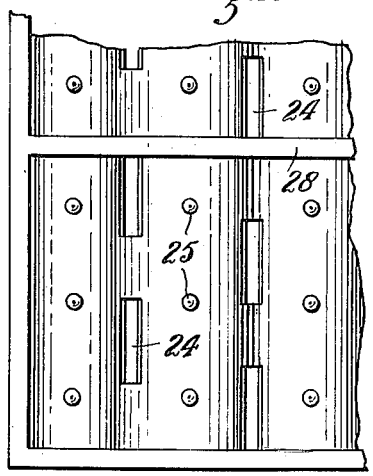
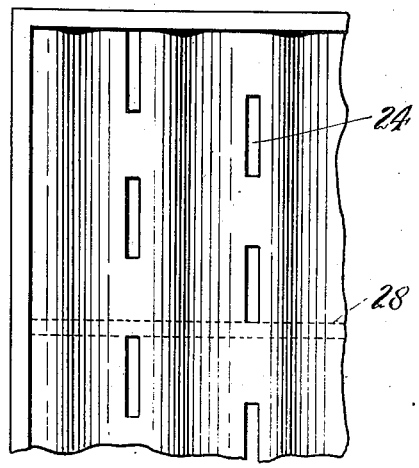
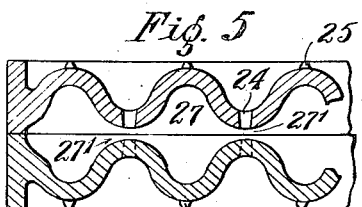
Inventor
W. C. Davis Patented Aug. 5, 1924.

1,504,102

UNITED STATES PATENT OFFICE.

WILLIAM C. DAVIS, OF PRAHRAN, NEAR MELBOURNE, VICTORIA, AUSTRALIA.

APPLIANCE FOR BROILING, COOKING, AND TOASTING FOODSTUFFS.

Application filed August 7, 1923. Serial No. 656,226.

*To all whom it may concern:*

Be it known that I, WILLIAM CHARLES DAVIS, a subject of the King of Great Britain, residing at Prahran, near Melbourne, in the State of Victoria, Commonwealth of Australia, have invented new and useful Improvements in Appliances for Broiling, Cooking, and Toasting Foodstuffs, of which the following is a specification.

This invention relates to improvements in appliances for broiling, cooking and toasting foodstuffs, and more particularly to improvements in cooking appliances of that type which comprises a frame detachably supporting a broiler device having grooved grid-bars and a catchment trough for fat, and a heat radiating element or elements for the toasting of bread or similar foodstuffs.

The use of cooking appliances previously devised and of the type hereinbefore outlined has been attended by many disadvantages, amongst which are (a) the liability of the grids to buckle due to the fact that they were fixedly mounted in a grid frame and consequently no proper provision was made for expansion and contraction of the grids which receive the maximum amount of heat, (b) the absence of provision for interchangeably fitting broiling grids, (c) the lack of means to conduct excessive smoke from a kitchen or like culinary department, and (d) the absence of satisfactory means which will ensure that overflowing fat exuded from the foods being broiled will drip at predetermined points and prevent fouling of the appliance.

The present invention has been devised to remedy the above and other defects incidental to the use of cooking appliances of the type hereinbefore mentioned, and it provides a cooking appliance which will effect considerable economy in fuel consumption and obtain a maximum efficiency when used for broiling, cooking of foodstuffs.

The invention consists of the features of construction, combination and arrangement hereinafter fully described, reference being had to the accompanying drawings, wherein:—

Figure 3 is a view in central longitudinal section of Figure 1.

Figure 4 is a fragmentary view in section showing the arrangement of two corrugated heat radiating plates.

Figure 5 is a similar view to Figure 4 showing the heat radiating plates when one is arranged in reversed position.

Figure 6 is a view in plan, and Figure 7 is a view in underside plan of one of the heat radiating plates.

Figure 1:
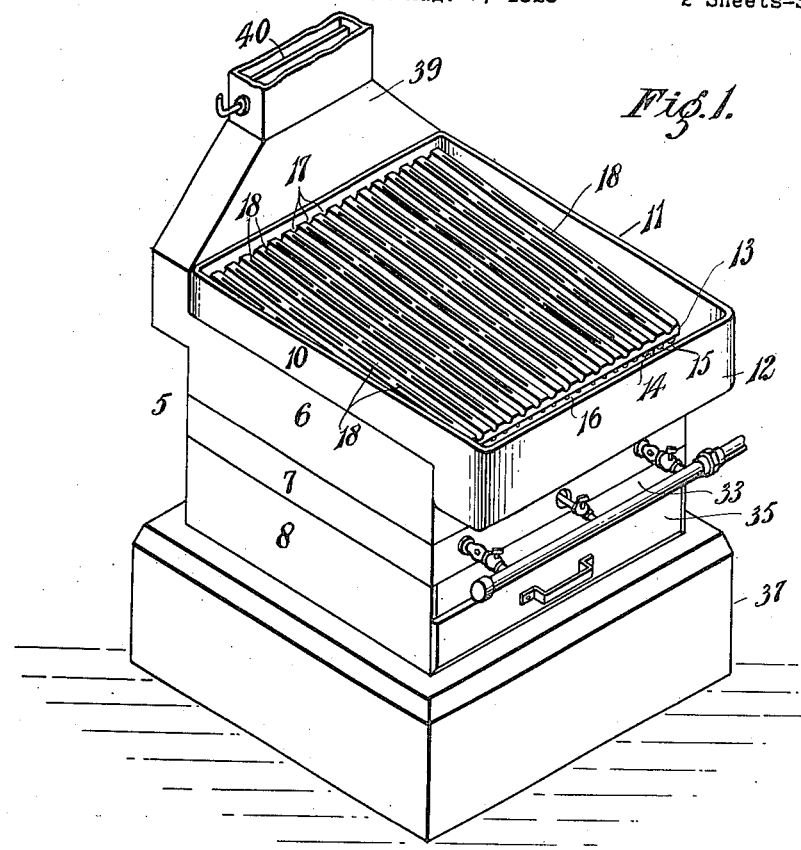
Figure 1 is a view in perspective of a broiling, cooking and toasting appliance embodying my improvements.
Figure 2:
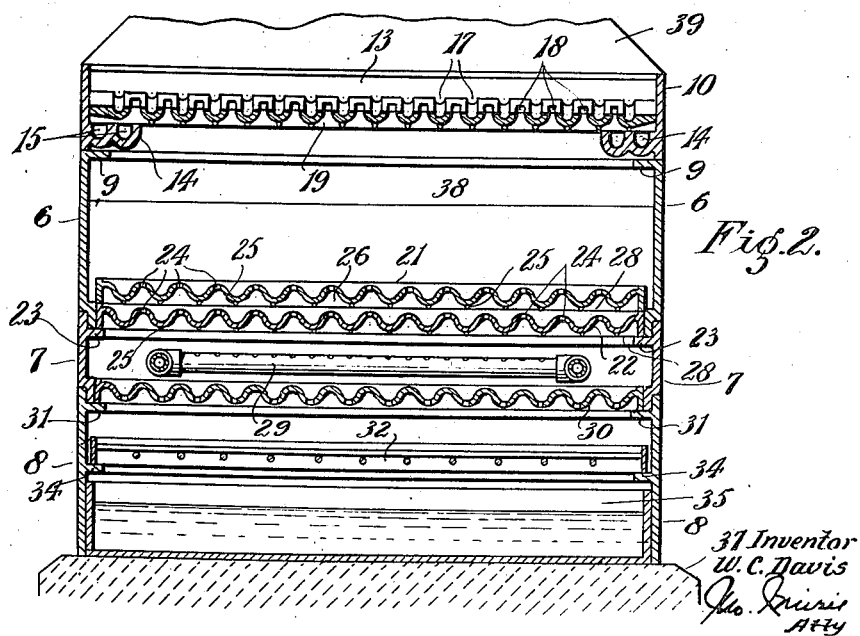
Figure 2 is a view in cross-section of Figure 1.

The broiling, cooking and toasting appliance according to the improvements comprises a main body or shell 5 which is formed in three interfitting sections 6, 7 and 8 that are of rectangular shape and arranged one above the other.

The uppermost body section 6 is furnished with an inwardly projecting flange 9 upon which is detachably supported a rectangular-shaped griller or broiler frame 10 having four vertical walls 11 and furnished at its front end portion with a compartively deep catchment well or trough 12 adapted to receive and collect any fat or liquid exuded from the food whilst it is being cooked. This griller or broiler frame 10 is designed to detachably support a grilling or broiling grid 13, and for this purpose said frame is constructed having two longitudinally arranged flanges 14 which project inwardly from the side walls 11 and are arranged at a required incline from the horizontal so as to impart sufficient inclination to the grilling grid 13 to enable the fat or liquid to flow freely into said catchment well 12.

Grooves or channels 15 are formed longitudinally in said flanges 14 and they function as collecting chambers for any surplus fat, conducting it to the catchment well or trough 12 and preventing it from fouling or running down the sides of the appliance. A grooved flange or ledge 16 is formed transversely across the griller frame 10 at the rear of the catchment well 12 and it is adapted to support the front end of the grid 13.

The detachable grilling or broiling grid 13 is constructed substantially in corrugated form so as to provide longitudinal grooves or channels 17, down and along which the surplus fat or liquid from the food flows into said catchment well or trough 12.

A series of regularly spaced slots 18 are formed in the upper corrugated portion of said grid 13 for the passage therethrough of radiated heat, while ribs 19 are formed transversely across and depend from the underside of said grid 13 and function as means for preventing the fat, overflowing from said grooved grid bars, from coursing uninterruptedly along the underside thereof. The said ribs 19 also strengthen the grid 13 and prevent same from buckling under execessive heat conditions. The lowermost of said ribs 19 also functions as a locating piece to retain the grid frame 13 in correct position, and for this purpose said rib abuts against a stop member 20 formed on the transverse ledge or flange 16 which is disposed at the inner end of the catchment well—see Figure 3.

The intermediate sections 7 of the main body or shell 5 of the appliance is adapted to detachably support a pair of superimposed heat radiating plates 21 and 22, for which purpose it is furnished with an inwardly projecting flange 23. These heat radiating plates are of corrugated formation as shown in Figures 4, 5 and 6, and parallel rows of slots 24 are formed in the ridge members of the corrugations, said slots having tapering walls for effective heat distribution. V-section projections 25 are formed in a longitudinal row on the undersurface of the channel portion of each corrugation, and they function as drip points for overflowing fat which may pass through said slots 24 and be collected by the channels of the bottom heat radiating plate 22.

The two heat radiating plates 21 and 22 are preferably arranged one above the other in such a manner that the channel portions of the upper plate 21 are directly above or in register with the channel portions of the lower plate 22—see Figure 4.

This arrangement provides inclined or curved baffle walls against which the heated air passing through the slots 24 in the bottom plate 22 is caused to impinge, while a sinuous heat passage 26 for preheated air and having a multiplicity of baffle surfaces is formed between said plates.

The relative positions of the two corrugated heat radiating plates 21 and 22 may be varied, as illustrated in Figure 5, by reversing the position of either of said plates. By this arrangement there is formed a series of chambers 27 connected by narrow passages 27¹ for pre-heated air, in lieu of the sinuous passage 26 hereinbefore referred to.

Each of the corrugated heat radiating plates 21 and 22 is constructed with one or more transverse strengthening ribs 28 to prevent buckling of said plates due to the great heat absorbed from a system of gas or other fuel burners 29, which are mounted within the intermediate section 7 of the appliance and located immediately beneath the lower of said heat radiating plates. A heat radiating plate 30 of similar construction to the radiating plates before-mentioned is detachably and reversibly supported upon a flange 31 formed on the lower section 8 of the body or shell of the appliance. This plate 30 is located beneath the fuel burners 29, and it functions to radiate heat to a toasting grid 32 of approved design, which is slidably inserted into the lowermost section 8 through an opening 33 formed in its front wall and is supported upon an inwardly projecting flange 34.

The lowermost section 8 of the appliance also accommodates a water tank 35 which is inserted through an opening 36 formed in the front wall, and supported upon a suitable base 37 upon which the whole appliance is mounted.

In order to prevent any objectionable fumes, which may be formed by the consumption of fat or the like exuded from the foods dripping onto the heated corrugated plate 21, from passing upwardly through the grilling or broiling grid 13 into the kitchen, a flue 38 is formed in the rear wall of the uppermost section 6. This flue is in communication with an uptake pipe 39 which is detachably supported upon said uppermost section 6 and is furnished with a pivoted damper 40 to regulate the draught therethrough.

In assembling the integers of the improved broiling, cooking and toasting appliance, the toasting grid 32 is slidably inserted within the opening 33 and detachably supported upon the flange or ledge 34. The corrugated heat radiating plate 30 is then placed in position and supported by the inward flange or ledge 31 formed on the lower casing section 8. The intermediate section 7 carrying the burners 29 with the gas piping connections and controls is placed over and interfits with said lowermost section 8.

The two reversible corrugated heat radiating plates 21 and 22 are then detachably mounted in the uppermost section 6, the lower plate 22 being supported by the flange or ledge 23, while the upper plate 21 rests upon and is supported by said lower plate 22. Said uppermost section 6 is then placed upon and interfits with the intermediate casing section 7.

The grid frame 10 is now placed upon the flange or ledge 9 of said uppermost section, when the detachable grid 13 is dropped into position on said grid frame, being supported by the longitudinal channelled ledges 14 and the transverse ledge 16, while the lowermost of the ribs 19 on the undersurface of said grid abuts against the locating stop 20 formed on said ledge 16.

When the burners 29 of the fuel supply system are ignited the curved walls of the lower positioned plate 22 form heat baffles with intermediate heat collecting chambers. This plate soon becomes heated to a high temperature degree, and heat is radiated therefrom. Simultaneously heated air passes through the slots 24 formed at the upper portions of said heating chambers into the sinuous passage 26 that is disposed between the upper and lower located plates 21 and 22, respectively. The upper of said plates, by reason of its corrugated formation, also provides a series of chambers with appropriate baffles, and the heat radiated from both of said plates, and the heated air that is conducted upwardly soon transmits ample heat to the detachably mounted grid 13 for the broiling of meats or other foodstuffs. Simultaneously the corrugated plate 30 disposed below said fuel burners becomes heated, and it radiates heat sufficiently to toast sliced bread or like foods supported upon the toasting grid 32.

The water contained within the tank 35 improves the quality of the toasted bread or like food, and as it becomes heated it may be utilized for culinary purposes.

The fat and liquid exuded from the foods supported on the corrugated grid 13 heated in the manner described, are initially collected by the grooves 17 and delivered gravitationally to the catchment well 12. Any surplus fat, which may overflow said grooves, passes through the slots 18, formed in the ridge portions of the grid, and courses along the undersurface of the grooved portions of the grid until interrupted by the ribs 19, which thereby function as baffles and drip points.

Any fat dripping from the ribs 19 and not consumed by the heat arising from the corrugated radiating plates 21 and 22 descends onto the upper of said corrugated radiating plates to be consumed by the heat thereof. Fat overflowing from the opposite sides of the corrugated grid 13 is collected by the channelled ledges 14, which are in communication with the catchment well 12.

Should fat be collected in such quantity as to overflow the grooves of the upper heat radiating plate 21, it passes through the slots 24 and is caused by the projections 25 to drip into the channels of the lower heat radiating plate 22, where it will be positively consumed.

In some cooking operations and when it is desired that a more even distribution of heat should take place through the upper and the lower located sections of the appliance, one of the corrugated plates 21 and 22 may be reversed in position as is seen in Figure 5.

The ease with which detachment of the sections 6, 7 and 8 and the reversible corrugated plates 21, 22 and 30 can be effected provides for ready accessibility to the various integers of the appliance for cleansing as also for repair or replacement purposes.

What I do claim is:—

1. A food cooking appliance comprising, a casing having fuel burners mounted therein, a corrugated heat radiating and reversible plate arranged within said casing above said burners, openings in said corrugated plate for the passage of heated air and gases, a grid frame having a catchment trough detachably mounted on said casing, a broiler grid of substantially corrugated form supported by said grid frame—the grooves of said grid communicating with said trough, slots formed in the ridge portions of said grid, and catchment means for fat and liquids overflowing from the grooves of said grid.

2. A food cooking appliance comprising, a casing having fuel burners arranged therein, corrugated heat radiating plates mounted in said casing—one above and one below said burners, slots in said corrugated plates for the passage of heated air and gases, a grid frame having a catchment trough mounted on said casing, a broiler grid of substantially corrugated form and having slots in its ridge portions fitted within said frame, means disposed beneath said grid for the collection of fat and liquids overflowing the grooves of said grid, and a toaster grid fitted beneath the lower of said corrugated heat radiating plates.

3. A food cooking appliance comprising, a casing having fuel burners arranged therein, two superimposed corrugated and reversible plates mounted in said casing above said burners, slots being formed in said plates for the passage of heated air and gases and a broiler grid mounted above said corrugated plates.

4. A food cooking appliance comprising, a casing having fuel burners arranged therein, two superimposed corrugated reversible plates mounted in said casing above said burners, a broiler grid fitted above said corrugated plates, a corrugated plate mounted beneath said burners, a toaster grid below the last-mentioned corrugated plate, and a water tank disposed below said toaster grid—slots being formed in each of said corrugated plates for the passage of heated air and gases.

5. A food cooking appliance according to claim 2, wherein the casing is composed of superimposed interfitting sections, and the upper section is furnished with a flue having a regulatable damper.

6. In a food cooking appliance of the character described, a broiler having a frame constructed with a catchment trough, ledges on said frame, a grid of substantially corrugated form detachably supported by said ledges within said frame, slots in the ridge portions of said grid, ribs arranged transversely on the undersurface of said grid, and locating means on said frame and the grid detachably fitted thereto.

7. In a food cooking appliance of the character described, a broiler according to claim 6, wherein the ledges supporting the grid are channelled and function as catchments for fat and liquids overflowing the sides of said grid.

8. In a food cooking appliance of the character described, the combination with fuel burners of heat radiating plates of corrugated formation and apertured to permit the passage of heated air and gases, said corrugated plates being reversible to provide therebetween a sinuous passage having heat chambers and curved baffles, or alternatively a series of heat collecting chambers each having a narrowed entrance and a narrowed outlet end.

9. In a food cooking appliance of the character described, the combination with fuel burners of two superimposed heat radiating plates of corrugated formation, said plates being mounted reversibly and also slotted to permit the passage of heated air and gases, reinforcing ribs and teats, functioning as drip points, on the undersurface of said corrugated plates.

10. A food cooking appliance comprising, a casing composed of three superimposed interfitting sections, fuel burners mounted in the intermediate section, a toaster grid slidable in the lowermost section, a water tank beneath said toaster grid, a frame having a catchment trough supported by the uppermost section, a broiler grid detachably fitted within said frame, said grid being of substantially corrugated design and having heat distributing slots formed therein, and apertured heat radiating plates of corrugated formation mounted detachably and reversibly in said casing above and below said burners.

In testimony whereof I affix my signature in presence of two witnesses.

WILLIAM C. DAVIS.

Witnesses:
JAMES H. ANDERSON,
ANDREW W. SMITH.